Dec. 14, 1965     D. H. BUTLER ETAL     3,223,374

MINIATURE VIBRATION ISOLATOR

Filed May 23, 1963

INVENTORS
DAVID H. BUTLER
WILBERT C. FALK

BY

ATTORNEYS

United States Patent Office 3,223,374
Patented Dec. 14, 1965

3,223,374
MINIATURE VIBRATION ISOLATOR
David H. Butler and Wilbert C. Falk, Hampton, Va., assignors to the United States of America as represented by the Administrator of the National Aeronautics and Space Administration
Filed May 23, 1963, Ser. No. 282,817
12 Claims. (Cl. 248—358)
(Granted under Title 35, U.S. Code (1952), sec. 266)

The invention described herein may be manufactured and used by or for the Government of the United States of America for governmental purposes without the payment of any royalties thereon or therefor.

This invention relates to a vibration isolator, and more particularly to a vibration isolator which is adapted for use with the miniaturization technology.

There are numerous types of vibration isolators available commercially; however, as a general rule they do not lend themselves to use in the field of miniaturization. Most of these isolators are constructed from elastomer compounds such as rubber and modified rubber compounds. Although they are effective isolators for the purpose designed, they are normally large and bulky and do not adapt themselves to an environment such as the installation of equipment in a compact missile payload construction. Commercially available isolators require more space than is often available and may be difficult to install or assemble in a limited space environment. In certain compact equipment construction it is necessary for the workman to work blind; therefore, the particular assembly of the isolator must be extremely simple and essentially foolproof.

Other types of vibration isolators include things such as springs, cables, and wire mesh. These are also operative for the purposes intended, but are not particularly adapted to miniaturization. The cost of manufacturing such resilient metallic structures in very small sizes is often excessive. Furthermore, it is difficult to design the necessary elasticity into metallic members to be utilized in the space available in the compact arrangements.

The above problems are overcome by the present invention wherein a vibration isolator is constructed by compressing a piece of elastic tubing in a manner such that it folds upon itself to provide the necessary damping between members to alleviate the transmission of vibration of one member to another.

It is, therefore, an object of this invention to provide a vibration isolator which is particularly adapted for use in miniaturization technology.

Another object of this invention is to provide a vibration isolator which consists of a minimum number of component parts which are of extremely simple design.

Yet another object of this invention is to provide a vibration isolator which lends itself to assembly in compact areas.

Still another object of this invention is to provide a vibration isolator which adapts itself readily to various size requirements.

Another object of this invention is to provide a vibration isolator wherein an elastic material is utilized which when compressed will buckle to form beads of resilient material between the members being isolated.

These and other objects and advantages of this invention will become more apparent upon reading the specification in conjunction with the accompanying drawings.

Basically, this invention relates to a vibration isolator which is particularly adapted for use in attaching compact equipment packages to support structure. In accomplishing the purposes and intent of the invention the equipment package and support structure are provided with a plurality of aligned apertures. The apertures in one of the members are enlarged and receive elastic tubing which fit therethrough and abut the other member. The elastic tubing projects on either side of the member with the enlarged apertures. Cup-like washers engage and surround the non-abutting ends of the elastic tubes. Fasteners, such as screws, pass through the cup-like washers, the tubes and the apertures, and engage nuts. When the screws are tightened the elastic tubes are compressed and caused to buckle forming resilient beads between the members and one of the members and the cup-like washers.

Figure 1:
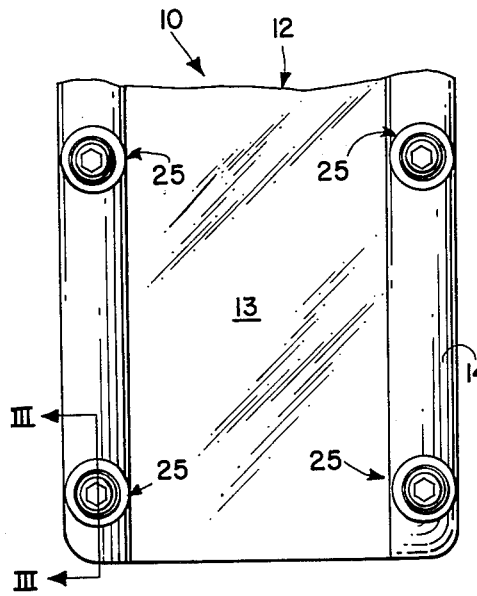
FIG. 1 is a plan view of an equipment installation utilizing vibration isolators according to the present invention.
Figure 2:
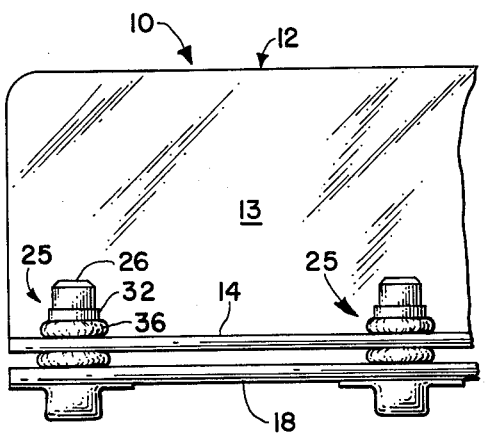
FIG. 2 is a side elevational view of an equipment installation utilizing vibration isolators according to the present invention.

Referring now more specifically to the details of the invention, FIGS. 1 and 2 show an equipment assembly, designated generally by the reference numeral 10. The equipment assembly 10 further includes generally the equipment package 12, the support structure 18 and the vibration isolator assemblies 25.

The equipment package 12 may be any one of a number of items, but for purposes of illustration it will be considered an electronic transmitter. The transmitter is located within a housing 13 in a conventional manner. The housing 13 has flanges 14 which are provided with apertures 15 at spaced intervals along either side of the housing.

Figure 3:
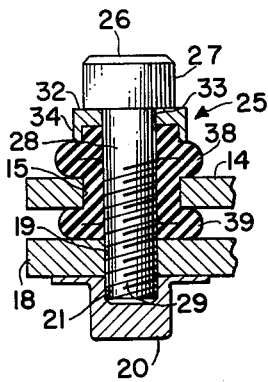
FIG. 3 is a cross sectional view taken along the section lines III—III of FIG. 1, showing the details of the vibration isolator.

The support structure 18 may be any structure which is available to support the equipment package. In a missile payload it may be the base of the payload or the side of the payload, depending upon the space available and the desired location of the equipment. The support structure is provided with apertures 19 which are located so as to be in alignment with the apertures 15 formed in the flanges in the equipment package. Nuts 20 may be formed integral with the support structure as shown in FIGS. 2 and 3 or may be of a conventional design. In constructing a missile payload it is often necessary to form the nuts integral with the support structure since the equipment is placed in tiers or in other arrangements whereby the bottom of the support structure is not accessible. For purposes of illustration the apertures 15 are shown in a larger diameter than the apertures 19; however, it is to be understood that within the broadest aspect of the invention this arrangement may be reversed as the situation demands. The nuts 20 are provided with threads 21 to receive the threads of bolts or screws which form a part of the vibration isolator assembly 25 now to be described.

Figure 4:
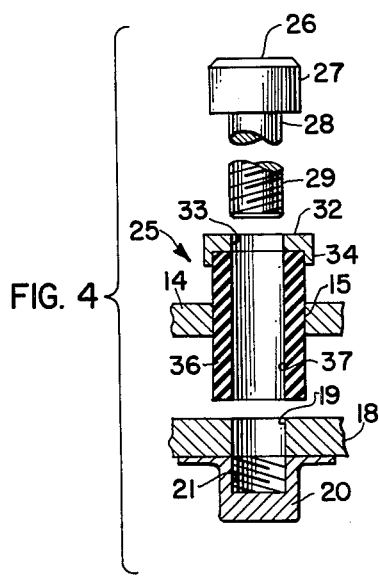
FIG. 4 is an exploded cross-sectional view as in FIG. 3, showing the manner of assembly of the vibration isolator.

The vibration isolator 25 is best illustrated in FIGS. 3 and 4. FIG. 3 shows a vibration isolator in the assembled position and FIG. 4 shows it before assembly. The assembly includes a bolt 26 which has a head 27 and shank 28. A portion of the shank 28 is provided with threads 29.

The assembly 25 also includes a cup-like washer or counterboard washer 32. The washer 32 has a central aperture or opening 33 and lip or flange 34.

The damping component of the vibration isolator assembly 25 is an elastic or resilient tube 36. The tube 36 has a central passage 37 and may be constructed from materials such as rubber, neoprene, silicon rubber or various other elastomer compounds. The tubing is of a thickness such that when compressed it will buckle and fold upon itself to form beads 38 and 39 as shown in FIG. 3. The beads 38 and 39 are thus a double layer of the tubing forming an effective isolation structure between the equipment package 14 and support structure 18.

Figure 5:
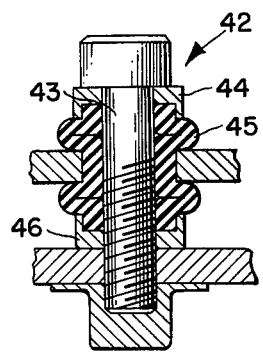
FIG. 5 is a cross sectional view showing a modified form of a vibration isolator.

A modified form of vibration isolator is shown in FIG. 5, designated generally by the reference numeral 42. In this arrangement the isolator assembly includes a bolt 43, top washer 44 and elastic tube 45 all similar to these elements in isolator assembly 25. The arrangement differs in that a bottom cup-like washer 46 engages the end of the elastic tube which would otherwise normally abut against the support structure. The bottom washer 46 is identical to the top washer 44 and may be used interchangeably. The bottom washer 46 assumes a position opposite the washer 45 for purposes now to be explained in the assembly and operation of the invention.

ASSEMBLY AND OPERATION

The assembly of the vibration isolator is best illustrated in FIG. 4. The apertures 15 and 19 in the equipment package and support structure are aligned. The elastic tubes 36 are cut to a length such that sufficient material will project on either side of the member through which the tubes are to be passed so that when the tube is placed under compression it may collapse and form the beads 38 and 39. The elastic tubing is normally centered such that an equal amount of material projects on either side of the members through which it is fitted so that beads of approximately the same size will be formed on either side of the member. The cup-like washer 32 is placed on the end of the elastic tube 36 which is opposite to the end of the tube which will abut the structural member 18 as shown in FIG. 4. The shank 28 of bolt 26 is threaded through the opening 33 in the washer, through the tube passage 37, the aperture 19 in the support structure 18 and the threads 29 thereof are engaged with the threads 21 of nut 20.

In operation the screw 26 is tightened compressing the elastic tube 36. The lip 34 on washer 32 prevents the end of the elastic tube from expanding thereby forcing it to buckle outwardly forming the bead 38. The portion of elastic tube 36 located between the instrument package flange 14 and the support structure 18 behaves similarly forming the bead 39. It has been found that the elastic tube section between the flange 14 and support structure 18 will buckle outwardly as long as the abutting end of the elastic tube engages a large surface area on the member 18. Should the necessary surface area of the support member 18 be absent, an additional cup-like washer or bottom washer may be utilized as shown in FIG. 5 by vibration isolator assembly 42.

Under certain assembly procedures it may be desirable to bond the elastic tube to the particular member through which it is fitted. This is particularly desirable when the workman is functioning blind, this meaning the area of the elastic tube between the members is not open to visual inspection. With this arrangement it may be also desirable to fix a bottom washer in place by conventional techniques. Normally, however, the bonding procedure is not necessary as long as the elastic tube has a snug fit with the aperture through which it passes.

Although the vibration isolator is shown as being utilized as a means for damping vibration between an equipment package and a support structure, it is to be understood that the principle can be applied to several tiers of plates rather than two as illustrated. Thus, the elastic tube could pass through two or three apertures formed in tiers or stacks of separated plates. Furthermore, the principle could be applied to the assembly, such as shown in FIG. 3, in manner such that the elastic tube would pass through the apertures in both the equipment package and the support structure, the apertures being the same size rather than of a differential size as shown. With this arrangement a top and bottom cup-like washer would be utilized and the elastic tube upon being compressed would form a bead on either side of the equipment package and support structure, as well as between these members. Obviously, the arrangement in FIG. 3 can be reversed such that the enlarged apertures placed in the support structure rather than in the equipment package and the vibration isolator assembly 25 reversed.

From the above description it is clear that the vibration isolator of this invention is of an extremely simple design. Outside of the screw, the assembly includes only the piece of elastic tubing and the cup-like washer. The invention is readily adaptable to different sizes by merely selecting the proper size of tubing. Production costs are minimized by using commercially available elastic tubing since it is not necessary to cut or form grooves in the tube, the beads being formed from the tube itself upon compression thereof in assembly. The device is particularly suited for use in the miniaturization field since very small tubing can be utilized and still have the capability of buckling to form the beads necessary for vibration isolation. The quantity of elastic materials utilized is less than that of existing isolators using elastomer compounds. The tubing to be operative must be thin enough under compression to buckle and form beads. With existing structures the beads must be formed from an original piece of stock which has several times the thickness of the piece of tubing utilized in the instant invention. It should also be noted that the tubing readily passes through an aperture for assembly purposes even though it fits snugly. Much more difficulty is experienced in installing a bead which is half again or twice the size of the aperture through which it is being passed. Of course, there is less chance of damage to the tubing than with the arrangement where the bead is already formed and forced through a smaller hole. Also, by selecting tubing of various elastomers and durometer hardness the stiffness of the isolator can be readily changed, providing a range of isolator natural frequency response. Similarly by selection of tubing the optimum size and weight is readily available, particularly important in the compact missile payload construction.

What is claimed as new and desired to be secured by Letters Patent of the United States is:

1. A miniature vibration isolation assembly comprising: a first member; a second member to be mounted in spaced relation to said first member; said first and second members having aligned apertures; the aperture in one of said members being larger than the aperture in the other member; an elastic tube fitting through the large aperture and abutting said other member; a cup-like washer engaging and surrounding the nonabutting end of said elastic tube; fastener means passing through said apertures, tube and cup-like washer; and folded beads formed between said first and second members and one of said members and said cup-like washer upon compression of said elastic tube to isolate said members.

2. A miniature vibration isolation assembly comprising: a first member; a second member to be mounted in spaced relation to said first member; said first and second members having aligned apertures; elastic means located within the aperture in one of said members; fastener means passing through said elastic means and said apertures; means engaging said elastic means upon tightening said fastening means whereby said elastic means is caused to fold upon itself forming beads to isolate said members.

3. A miniature vibration isolation assembly as in claim 2 wherein said means engaging said elastic means is a a cup-like washer.

4. A miniature vibration isolation assembly as in claim 2 wherein said means engaging said elastic means is a pair of cup-like washers at opposite ends of said elastic means.

5. A miniature vibration isolation assembly as in claim 2 wherein said elastic material is made from neoprene.

6. A miniature vibration isolation assembly as in claim 2 wherein said elastic material is made from silicone rubber.

7. A miniature vibration isolation assembly as in claim 2 wherein said elastic means has a substantially uniform cross-sectional dimension throughout.

8. A miniature vibration isolation assembly comprising: a first member; a second member to be mounted in spaced relation to said first member; said first and second members having an aligned aperture; an elastic tube fitting through at least one of said apertures; cup-like washers engaging and surrounding the ends of said elastic tube; fastener means passing through said apertures, the elastic tube and said cup-like washers; and folded beads formed in the elastic tube upon tightening said fastener to isolate said members.

9. A miniature vibration isolation assembly as in claim 8 wherein said elastic tube is bonded to structure forming the aperture of at least one of said members to facilitate assembly and the folding of the tube upon itself.

10. A miniature vibration isolation assembly as in claim 8 wherein said fastening means includes a nut formed integral with at least one of said members to facilitate assembly.

11. A miniature vibration isolation assembly comprising: a support member; a piece of equipment; said equipment having spaced apertures aligned with aperture formed in said support structure; said apertures in said support structure being enlarged; elastic tubes of a dimension capable of folding upon itself under small compressive loads fitting within said enlarged apertures and abutting said support structure; cup-like washers engaging and surrounding the nonabutting ends of said tubes; screws passing through said washers and elastic tubes and engaging nuts formed integral with said support structure; and resilient folded beads formed by the compression of said elastic tubes between said support structure and said equipment and said cup-like washers and said equipment whereby said equipment is isolated from the vibrations of said support structure.

12. A miniature vibration isolation assembly as in claim 11 wherein said cup-like washers engage and surround the ends of said tubes located between said equipment and support structure.

References Cited by the Examiner

UNITED STATES PATENTS

| | | | |
|---|---|---|---|
| 214,670 | 4/1879 | Langen | 248—22 X |
| 2,034,639 | 3/1936 | Saurer | 248—7 |
| 2,076,034 | 4/1937 | Lampman | 248—358 X |
| 2,091,679 | 8/1937 | Grant | 248—9 |
| 2,137,480 | 11/1938 | Dye | 248—15 X |
| 2,361,184 | 10/1944 | Ellis | 248—358 |
| 2,460,586 | 2/1949 | Keetch | 248—7 X |
| 2,864,573 | 12/1958 | Olley et al. | 248—9 |
| 2,975,960 | 3/1961 | Atalla | 248—15 X |

FOREIGN PATENTS 1,124,389  6/1956  France.

CLAUDE A. LE ROY, *Primary Examiner.*

FRANK L. ABBOTT, *Examiner.*

R. P. SEITTER, *Assistant Examiner.*